(12) United States Patent
Tang et al.

(10) Patent No.: US 11,760,500 B2
(45) Date of Patent: Sep. 19, 2023

(54) SYSTEMS AND METHODS FOR FILLING A FUEL MANIFOLD OF A GAS TURBINE ENGINE

(71) Applicant: PRATT & WHITNEY CANADA CORP., Longueuil (CA)

(72) Inventors: Poi Loon Tang, Montreal (CA); Philippe Beauchesne-Martel, Brossard (CA); James Robert Jarvo, Saint-Bruno-de-Montarville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 534 days.

(21) Appl. No.: 16/679,879

(22) Filed: Nov. 11, 2019

(65) Prior Publication Data
US 2021/0139158 A1 May 13, 2021

(51) Int. Cl.
*B64D 37/00* (2006.01)
*F02C 9/42* (2006.01)
*F02C 9/28* (2006.01)

(52) U.S. Cl.
CPC ............... *B64D 37/00* (2013.01); *F02C 9/28* (2013.01); *F02C 9/42* (2013.01); *F05D 2270/04* (2013.01); *F05D 2270/31* (2013.01); *F05D 2270/70* (2013.01)

(58) Field of Classification Search
None
See application file for complete search history.

(56) References Cited

U.S. PATENT DOCUMENTS

| | | |
|---|---|---|
| 3,834,160 A | 9/1974 | Moehring et al. |
| 4,404,806 A | 9/1983 | Bell, III et al. |
| 4,491,272 A | 1/1985 | Bradley et al. |
| 5,243,816 A | 9/1993 | Huddas |
| 5,277,023 A | 1/1994 | Bradley et al. |
| 5,349,811 A | 9/1994 | Stickler et al. |
| 5,402,634 A | 4/1995 | Marshall |
| 5,406,798 A | 4/1995 | Wiesner, Jr. |
| 5,694,764 A | 12/1997 | Blain et al. |
| 5,735,117 A | 4/1998 | Toelle |
| 5,809,771 A | 9/1998 | Wernberg |
| 5,899,073 A | 5/1999 | Akimaru |
| 6,125,624 A | 10/2000 | Prociw |

(Continued)

FOREIGN PATENT DOCUMENTS

| | | |
|---|---|---|
| CN | 105716119 B | 10/2018 |
| CN | 109356725 A | 2/2019 |

(Continued)

*Primary Examiner* — Arun Goyal
*Assistant Examiner* — William L Breazeal
(74) *Attorney, Agent, or Firm* — Norton Rose Fulbright Canada LLP

(57) ABSTRACT

Systems and method for filling a fuel manifold comprising at least a primary and a second manifold of a gas turbine engine are described. The method comprises providing fuel flow to the secondary manifold of the gas turbine engine, the secondary manifold being partly or completely empty; monitoring at least one engine operational parameter of the gas turbine engine as fuel fills the secondary manifold; and accelerating the engine when a transition threshold is reached, the transition threshold being associated with the engine operational parameter and indicative that fuel has reached the combustor.

20 Claims, 12 Drawing Sheets

(56) References Cited

U.S. PATENT DOCUMENTS

| | | |
|---|---|---|
| 6,619,025 B2 | 9/2003 | Wernberg |
| 6,892,544 B2 | 5/2005 | Futa, Jr. et al. |
| 7,003,939 B1 | 2/2006 | Rackwitz et al. |
| 7,131,274 B2 | 11/2006 | Baryshnikov et al. |
| 8,122,720 B2 | 2/2012 | Miyake |
| 8,601,861 B1* | 12/2013 | Vershinin ............... G01M 15/14 |
| | | 73/112.05 |
| 8,991,186 B2 | 3/2015 | Griffiths et al. |
| 9,103,284 B2 | 8/2015 | Erickson et al. |
| 9,267,439 B2 | 2/2016 | Corson et al. |
| 9,382,850 B2 | 7/2016 | Menon et al. |
| 9,404,423 B2 | 8/2016 | Griffiths et al. |
| 9,404,424 B2 | 8/2016 | Morawski et al. |
| 9,541,005 B2 | 1/2017 | Lamarre |
| 9,581,088 B2 | 2/2017 | Qin et al. |
| 9,683,744 B2 | 6/2017 | Patel et al. |
| 9,863,267 B2 | 1/2018 | O'Dea et al. |
| 10,233,846 B2 | 3/2019 | Zhang et al. |
| 10,317,082 B2 | 6/2019 | McBrien |
| 10,400,674 B2 | 9/2019 | Xu |
| 10,408,131 B2 | 9/2019 | Thompson et al. |
| 10,451,509 B2 | 10/2019 | Mehrer et al. |
| 10,465,908 B2 | 11/2019 | Stevenson et al. |
| 10,465,909 B2 | 11/2019 | Boardman et al. |
| 10,539,073 B2 | 1/2020 | Richards, Jr. |
| 2005/0011197 A1* | 1/2005 | Tuttle ..................... F02C 7/22 |
| | | 60/773 |
| 2010/0293961 A1* | 11/2010 | Tong ..................... F01D 19/00 |
| | | 60/778 |
| 2013/0042920 A1 | 2/2013 | Snodgrass et al. |
| 2013/0061599 A1 | 3/2013 | Van Alen |
| 2013/0259088 A1 | 10/2013 | Bellis et al. |
| 2015/0027100 A1 | 1/2015 | Qin et al. |
| 2016/0201917 A1 | 7/2016 | Dautova et al. |
| 2016/0245524 A1 | 8/2016 | Hill |
| 2016/0273453 A1 | 9/2016 | Frish et al. |
| 2017/0234229 A1 | 8/2017 | Ribarov et al. |
| 2017/0298840 A1 | 10/2017 | Doody |
| 2017/0306856 A1 | 10/2017 | Bickley |
| 2018/0163637 A1 | 6/2018 | Griffiths |
| 2018/0163966 A1 | 6/2018 | Jones et al. |
| 2018/0320600 A1* | 11/2018 | Lamarre ................... F02C 7/26 |
| 2019/0063754 A1 | 2/2019 | Dudebout et al. |
| 2019/0101062 A1 | 4/2019 | Vise et al. |
| 2019/0271470 A1 | 9/2019 | Boardman et al. |
| 2019/0292996 A1 | 9/2019 | Hicks |

FOREIGN PATENT DOCUMENTS

| | | |
|---|---|---|
| CN | 105823087 B | 10/2019 |
| GB | 888243 A | 1/1962 |
| GB | 2523126 A | 8/2015 |
| GB | 2572753 A | 10/2019 |
| GB | 2572783 A | 10/2019 |

\* cited by examiner

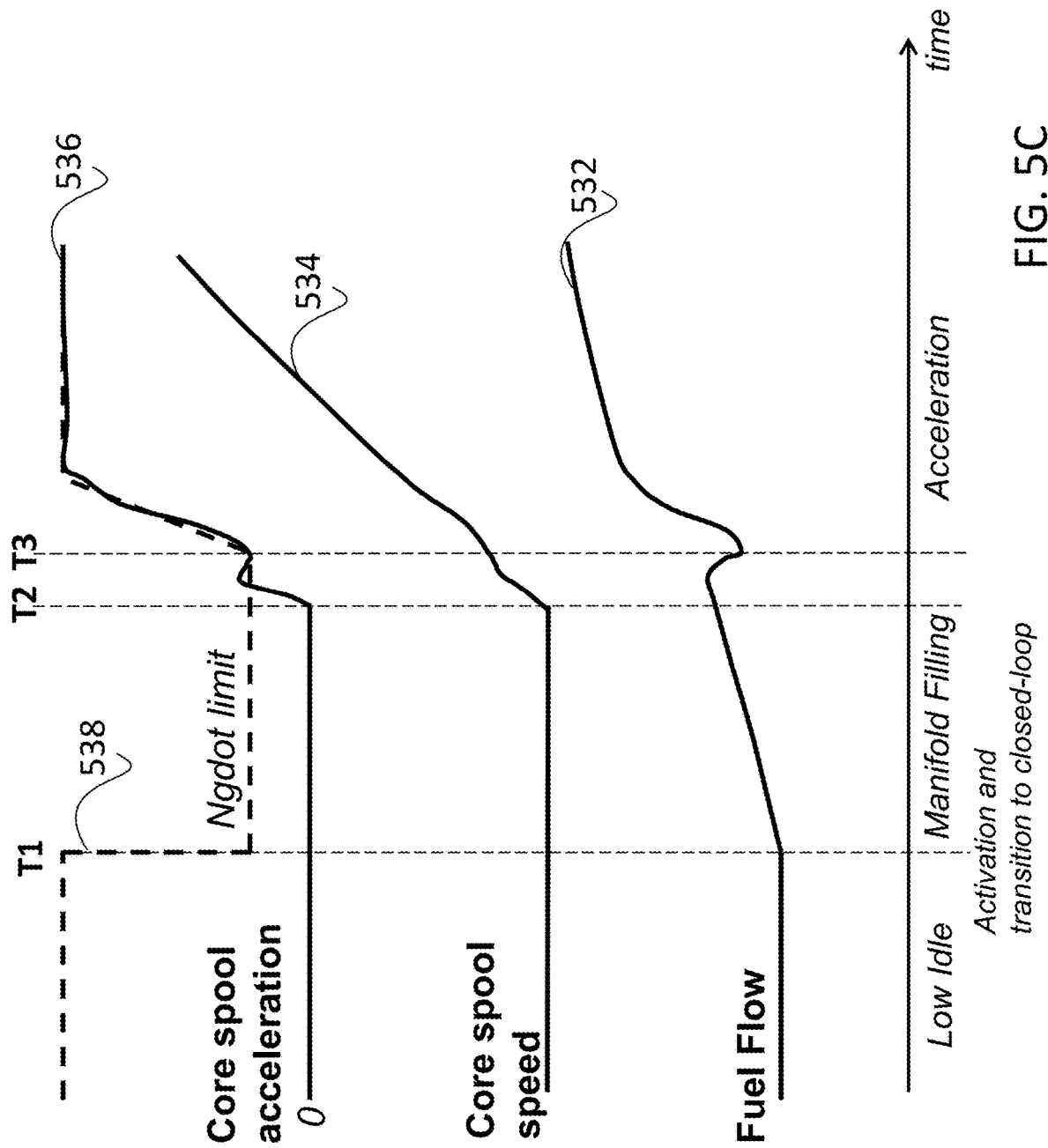

SYSTEMS AND METHODS FOR FILLING A FUEL MANIFOLD OF A GAS TURBINE ENGINE

TECHNICAL FIELD

The present disclosure relates generally to gas turbine engines, and more particularly to methods and systems of filling a manifold of a gas turbine engine in order to bring the engine to a given power level.

BACKGROUND OF THE ART

Starting a gas turbine engine, either on the ground or in-flight, requires filling of a gas manifold and nozzle before fuel reaches the combustor and starts to combust. If fuel is injected into the manifold too quickly, an over fuel spike into the combustor may cause the engine compressor to surge. However, it may be desired to fill the manifold quickly in order to bring the engine into a fully operational mode quickly.

Therefore, improvements are needed.

SUMMARY

In accordance with a broad aspect, there is provided a method for filling a fuel manifold comprising at least a primary and a second manifold of a gas turbine engine. The method comprises providing fuel flow to the secondary manifold of the gas turbine engine, the secondary manifold being partly or completely empty; monitoring at least one engine operational parameter of the gas turbine engine as fuel fills the secondary manifold; and accelerating the engine when a transition threshold is reached, the transition threshold being associated with the engine operational parameter and indicative that fuel has reached the combustor.

In accordance with another broad aspect, there is provided a system for filling a fuel manifold of a gas turbine engine. The system comprises a processing unit, and a non-transitory computer-readable medium having stored thereon program instructions executable by the processing unit. The program instructions are executable for providing fuel flow to a secondary manifold of the gas turbine engine, the secondary manifold being partly or completely empty; monitoring at least one engine operational parameter of the gas turbine engine as fuel fills the secondary manifold; and accelerating the engine when a transition threshold is reached, the transition threshold being associated with the engine operational parameter and indicative that fuel has reached the combustor.

Features of the systems, devices, and methods described herein may be used in various combinations, in accordance with the embodiments described herein.

BRIEF DESCRIPTION OF THE DRAWINGS

Reference is now made to the accompanying Figs. in which:

FIGS. 5A-5F are graphical illustrations of example approaches for filling a fuel manifold of a gas turbine engine;

It will be noted that throughout the appended drawings, like features are identified by like reference numerals.

DETAILED DESCRIPTION

There are described herein methods and systems for filling a fuel manifold of a gas turbine engine. In some embodiments, the gas turbine engine is part of a multi-engine aircraft and is operating in a standby mode, as described in more detail below. When operating in the standby mode, the engine may be running at low speed and hence, low fuel. Fuel in a secondary manifold of the gas turbine engine may be purged or emptied through gravity while the engine operates in the standby mode, for example to reduce fuel nozzle coking. When transitioning the engine from the standby mode to a non-standby mode, which may be an active mode or a regular operating mode, the secondary manifold of the gas turbine engine is refilled in accordance with a refilling scheme as described in the present disclosure.

In some embodiments, the refiling scheme for filling a fuel manifold of a gas turbine engine is applied upon engine start-up (on the ground or inflight), or during any other suitable operating mode of the aircraft, such as at high altitude idling and high altitude autorotation. Although described with reference to dual manifold systems, the manifold refilling scheme is also applicable to engine systems having more than two manifolds, such as three, four, or any other suitable number.

Figure 1A:
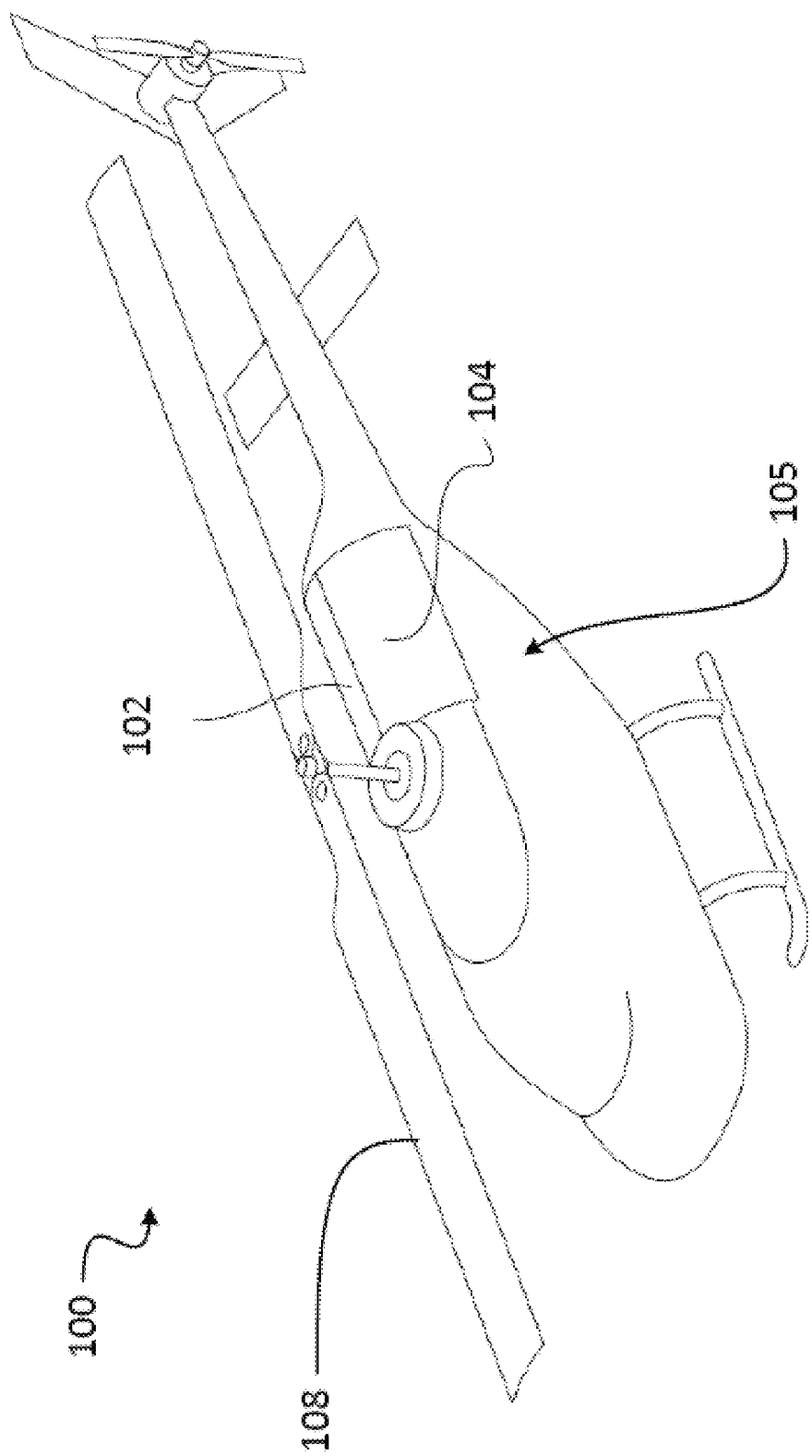
FIG. 1A is a schematic view of a multi-engine rotorcraft.

FIG. 1A depicts an exemplary multi-engine rotorcraft 100, which in this case is a helicopter. The rotorcraft 100 includes at least two gas turbine engines 102, 104. These two engines 102, 104 may be interconnected to a transmission clutch system (TCS) 105, as shown in FIG. 1B, to drive a main rotor 108.

Figure 1B:
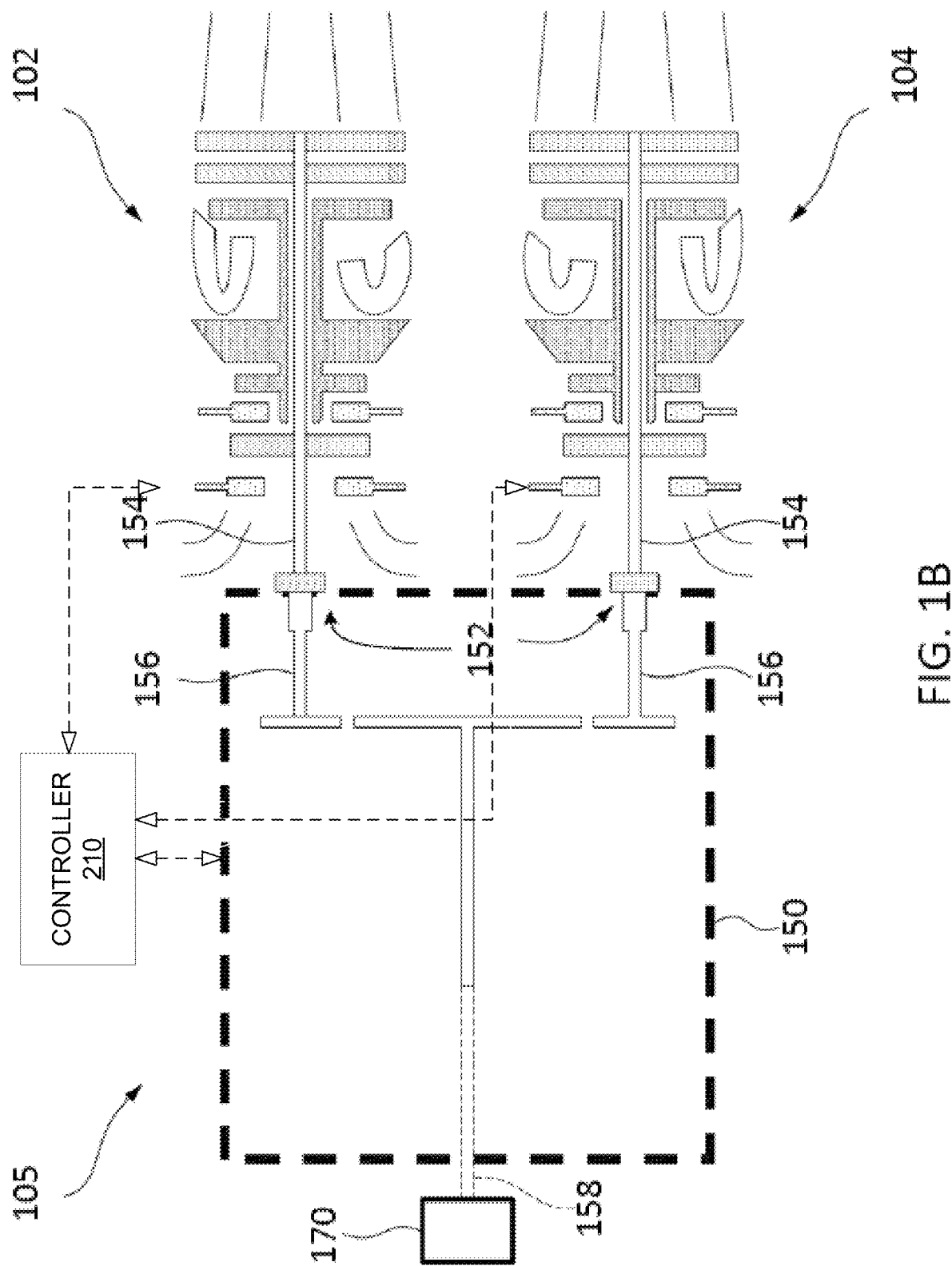
FIG. 1B is a schematic representation of an exemplary multi-engine system for the rotorcraft of FIG. 1A, showing axial cross-sectional views of two gas turbine engines.

Turning to FIG. 1B, illustrated is an exemplary multi-engine system. The multi-engine system may include two or more gas turbine engines 102, 104. In the case of a helicopter application, these gas turbine engines 102, 104 will be turboshaft engines. Control of the multi-engine system is effected by one or more controller(s) 210, which may be FADEC(s), electronic engine controller(s) (EEC(s)), or the like, that are programmed to manage the operation of the engines 102, 104 to reduce an overall fuel burn, particularly during sustained cruise operating regimes, wherein the aircraft is operated at a sustained (steady-state) cruising speed and altitude. The cruise operating regime is typically associated with the operation of prior art engines at equivalent part-power, such that each engine contributes approximately equally to the output power of the system. Other phases of a typical helicopter mission include transient phases like take-off, climb, stationary flight (hovering), approach and landing. Cruise may occur at higher altitudes and higher speeds, or at lower altitudes and speeds, such as during a search phase of a search-and-rescue mission.

In some embodiments, while the aircraft conditions (cruise speed and altitude) are substantially stable, the engines 102, 104 of the system may be operated asymmetrically, with one engine operated in a high-power "active" mode and the other engine operated in a lower-power (which could be no power, in some cases) "standby" mode. Doing so may provide fuel saving opportunities to the aircraft, however there may be other suitable reasons why the engines are desired to be operated asymmetrically. This operation management may therefore be referred to as an "asymmetric mode" or an "asymmetric operating regime", wherein one of the two engines is operated in a lower-power (which could be no power, in some cases) "standby mode" while the other engine is operated in a high-power "active" mode. The asymmetric operating regime may be engaged for a cruise phase of flight (continuous, steady-state flight which is typically at a given commanded constant aircraft cruising speed and altitude). The multi-engine system may be used in an aircraft, such as a helicopter, but also has applications in suitable marine and/or industrial applications or other ground operations.

Referring still to FIG. 1B, the multi-engine system is driving in this example a helicopter (H) which may be operated in the asymmetric operating regime, in which a first of the engines (say, 102) may be operated at high power in an active mode and the second of the engines (104 in this example) may be operated in a lower-power (which could be no power, in some cases) standby mode. In one example, the first engine 102 may be controlled by the controller(s) 210 to run at full (or near-full) power conditions in the active mode, to supply substantially all or all of a required power and/or speed demand of a common load 170. The second engine 104 may be controlled by the controller(s) 210 to operate at lower-power or no-output-power conditions to supply substantially none or none of a required power and/or speed demand of the common load 170. A clutch may be provided to declutch the low-power engine.

Controller(s) 210 may control the engine's governing on power according to an appropriate schedule or control regime. The controller(s) 210 may comprise a first controller for controlling the first engine 102 and a second controller for controlling the second engine 104. The first controller and the second controller may be in communication with each other in order to implement the operations described herein. In some embodiments, a single controller 210 may be used for controlling the first engine 102 and the second engine 104.

In another example, an asymmetric operating regime of the engines may be achieved through the one or more controller's 210 differential control of fuel flow to the engines, as described in pending application Ser. No. 16/535,256, the entire contents of which are incorporated herein by reference. Low fuel flow may also include zero fuel flow in some examples.

Although various differential control between the engines of the multi-engine system are possible, in one particular embodiment the controller(s) 210 may correspondingly control fuel flow rate to each engine 102, 104 accordingly. In the case of the standby engine, a fuel flow (and/or a fuel flow rate) provided to the standby engine may be controlled to be between 70% and 99.5% less than the fuel flow (and/or the fuel flow rate) provided to the active engine. In the asymmetric operating regime, the standby engine may be maintained between 70% and 99.5% less than the fuel flow to the active engine. In some embodiments, the fuel flow rate difference between the active and standby engines may be controlled to be in a range of 70% and 90% of each other, with fuel flow to the standby engine being 70% to 90% less than the active engine. In some embodiments, the fuel flow rate difference may be controlled to be in a range of 80% and 90%, with fuel flow to the standby engine being 80% to 90% less than the active engine.

In another embodiment, the controller 210 may operate one engine (say 104) of the multi-engine system in a standby mode at a power substantially lower than a rated cruise power level of the engine, and in some embodiments at substantially zero output power and in other embodiments less than 10% output power relative to a reference power (provided at a reference fuel flow). Alternately still, in some embodiments, the controller(s) 210 may control the standby engine to operate at a power in a range of 0% to 1% of a rated full-power of the standby engine (i.e. the power output of the second engine to the common gearbox remains between 0% to 1% of a rated full-power of the second engine when the second engine is operating in the standby mode).

In another example, the multi-engine system of FIG. 1B may be operated in an asymmetric operating regime by control of the relative speed of the engines using controller(s) 210, that is, the standby engine is controlled to a target low speed and the active engine is controlled to a target high speed. Such a low speed operation of the standby engine may include, for example, a rotational speed that is less than a typical ground idle speed of the engine (i.e. a "sub-idle" engine speed). Still other control regimes may be available for operating the engines in the asymmetric operating regime, such as control based on a target pressure ratio, or other suitable control parameters.

Although the examples described herein illustrate two engines, the asymmetric operating regime is applicable to more than two engines, whereby at least one of the multiple engines is operated in a low-power standby mode while the remaining engines are operated in the active mode to supply all or substantially all of a required power and/or speed demand of a common load.

In use, the first engine (say 102) may operate in the active mode while the other engine (say 104) may operate in the standby mode, as described above. During the asymmetric operating regime, if the helicopter (H) needs a power increase (expected or otherwise), the second engine 104 may be required to provide more power relative to the low power conditions of the standby mode, and possibly return immediately to a non-standby mode (i.e. a high- or full-power condition). This may occur, for example, in an emergency condition of the multi-engine system powering the helicopter, wherein the "active" engine loses power, and the power recovery from the lower power to the high power may take some time. Even absent an emergency, it will be desirable to repower the standby engine to exit the asymmetric operating regime.

In some embodiments, the standby engine may be de-clutched from the TCS 105 of the rotorcraft. As illustrated in FIG. 1B, first and second engines 102, 104 each having a respective transmission 152 are interconnected by a common output gearbox 150 to drive a common load 170. In one embodiment, the common load 170 may comprise a rotary wing of a rotary-wing aircraft. For example, the common load 170 may be a main rotor 108 of the aircraft 100. Depending on the type of the common load 170 and on the operating speed thereof, each of engines 102, 104 may be drivingly coupled to the common load 170 via the output gearbox 150, which may be of the speed-reduction type.

For example, the gearbox 150 may have a plurality of transmission shafts 156 to receive mechanical energy from respective output shafts 154 of respective engines 102, 104. The gearbox 150 may be configured to direct at least some of the combined mechanical energy from the plurality of gas turbine engines 102, 104 toward a common output shaft 158 for driving the common load 170 at a suitable operating (e.g., rotational) speed. It is understood that the TCS 105 may also be configured, for example, to drive accessories and/or other elements of an associated aircraft. The gearbox 150 may be configured to permit the common load 170 to be driven by either of the gas turbine engines 102, 104 or by a combination of both engines 102, 104 together.

Figure 2:
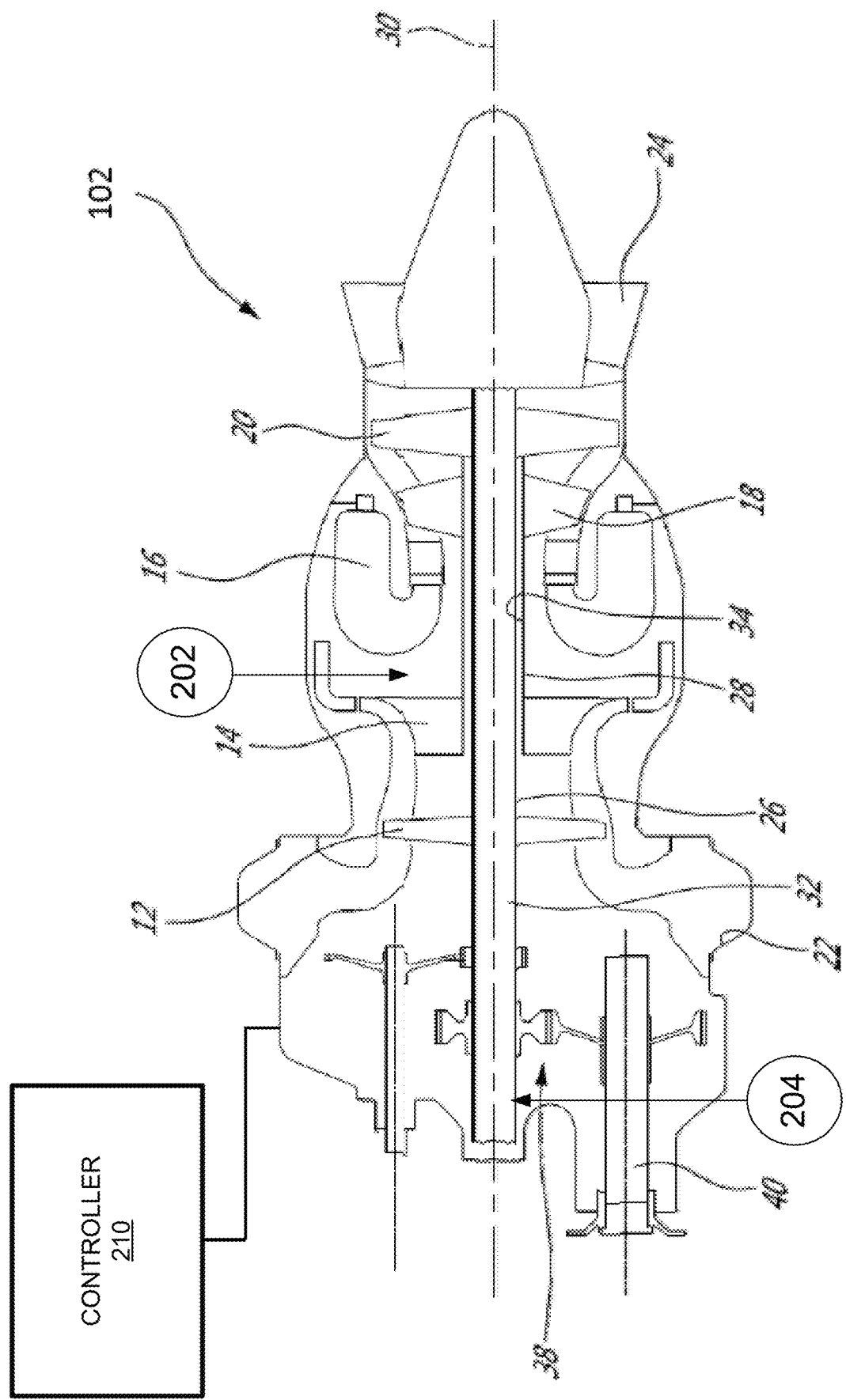
FIG. 2 is a cross-sectional view of an example turboshaft engine of the rotorcraft of FIG. 1A.

With reference to FIG. 2, the gas turbine engines 102, 104 can be embodied as turboshaft engines. Although the foregoing discussion relates to engine 102, it should be understood that engine 104 can be substantively similar to engine 102. In this example, the engine 102 is a turboshaft engine generally comprising in serial flow communication a low pressure (LP) compressor section 12 and a high pressure (HP) compressor section 14 for pressurizing air, a combustor 16 in which the compressed air is mixed with fuel and ignited for generating an annular stream of hot combustion gases, a high pressure turbine section 18 for extracting energy from the combustion gases and driving the high pressure compressor section 14, and a lower pressure turbine section 20 for further extracting energy from the combustion gases and driving at least the low pressure compressor section 12.

The low pressure compressor section 12 may independently rotate from the high pressure compressor section 14. The low pressure compressor section 12 may include one or more compression stages and the high pressure compressor section 14 may include one or more compressor stages. The low pressure compressor section 12 may include one or more variable guide vanes at its inlet or inter stage. The high pressure compressor section 14 may include one or more variable guide vanes at its inlet or inter stage. A compressor stage may include a compressor rotor, or a combination of the compressor rotor and a compressor stator assembly. In a multistage compressor configuration, the compressor stator assemblies may direct the air from one compressor rotor to the next.

The engine 102 has multiple, i.e. two or more, spools which may perform the compression to pressurize the air received through an air inlet 22, and which extract energy from the combustion gases before they exit via an exhaust outlet 24. In the illustrated embodiment, the engine 102 includes a low pressure spool 26 and a high pressure spool 28 mounted for rotation about an engine axis 30. The low pressure and high pressure spools 26, 28 are independently rotatable relative to each other about the axis 30. The term "spool" is herein intended to broadly refer to drivingly connected turbine and compressor rotors.

The low pressure spool 26 includes a low pressure shaft 32 interconnecting the low pressure turbine section 20 with the low pressure compressor section 12 to drive rotors of the low pressure compressor section 12. In other words, the low pressure compressor section 12 may include at least one low pressure compressor rotor directly drivingly engaged to the low pressure shaft 32 and the low pressure turbine section 20 may include at least one low pressure turbine rotor directly drivingly engaged to the low pressure shaft 32 so as to rotate the low pressure compressor section 12 at a same speed as the low pressure turbine section 20. The high pressure spool 28 includes a high pressure shaft 34 interconnecting the high pressure turbine section 18 with the high pressure compressor section 14 to drive rotors of the high pressure compressor section 14. In other words, the high pressure compressor section 14 may include at least one high pressure compressor rotor directly drivingly engaged to the high pressure shaft 34 and the high pressure turbine section 18 may include at least one high pressure turbine rotor directly drivingly engaged to the high pressure shaft 34 so as to rotate the high pressure compressor section 14 at a same speed as the high pressure turbine section 18. In some embodiments, the high pressure shaft 34 may be hollow and the low pressure shaft 32 extends therethrough. The two shafts 32, 34 are free to rotate independently from one another.

The engine 102 may include a transmission 38 driven by the low pressure shaft 32 and driving a rotatable output shaft 40. The transmission 38 may vary a ratio between rotational speeds of the low pressure shaft 32 and the output shaft 40.

One or more sensors 202, 204 are coupled to the engine 102 for acquiring data about one or more operating parameters of the engine 102. The sensors 202, 204, may be any suitable type of sensor used to measure operating parameters, such as but not limited to, speed sensors, acceleration sensors, pressure sensors, temperature sensors, altitude sensors, and the like. The sensors 202, 204, can be coupled to the engine controller 210 in any suitable fashion, including any suitable wired and/or wireless coupling techniques. In the example illustrated in FIG. 2, sensor 202 is a pressure sensor positioned to measure "P3" pressure, at an outlet of the high pressure compressor section 14, sensor 204 is a speed sensor positioned to measure the engine core spool speed (Ng), as represented by the rotational speed of the high pressure shaft 34. Note that in some embodiments, Ng is measured through the rotational speed an accessory coupled to the high pressure shaft 34, in some cases through an accessory gearbox, such as a starter/generator, a fuel control unit, an oil pump, or any other suitable accessory. Parameters such as P3 and Ng may be used in the manifold refilling scheme, as explained in more detail below.

Figure 3:
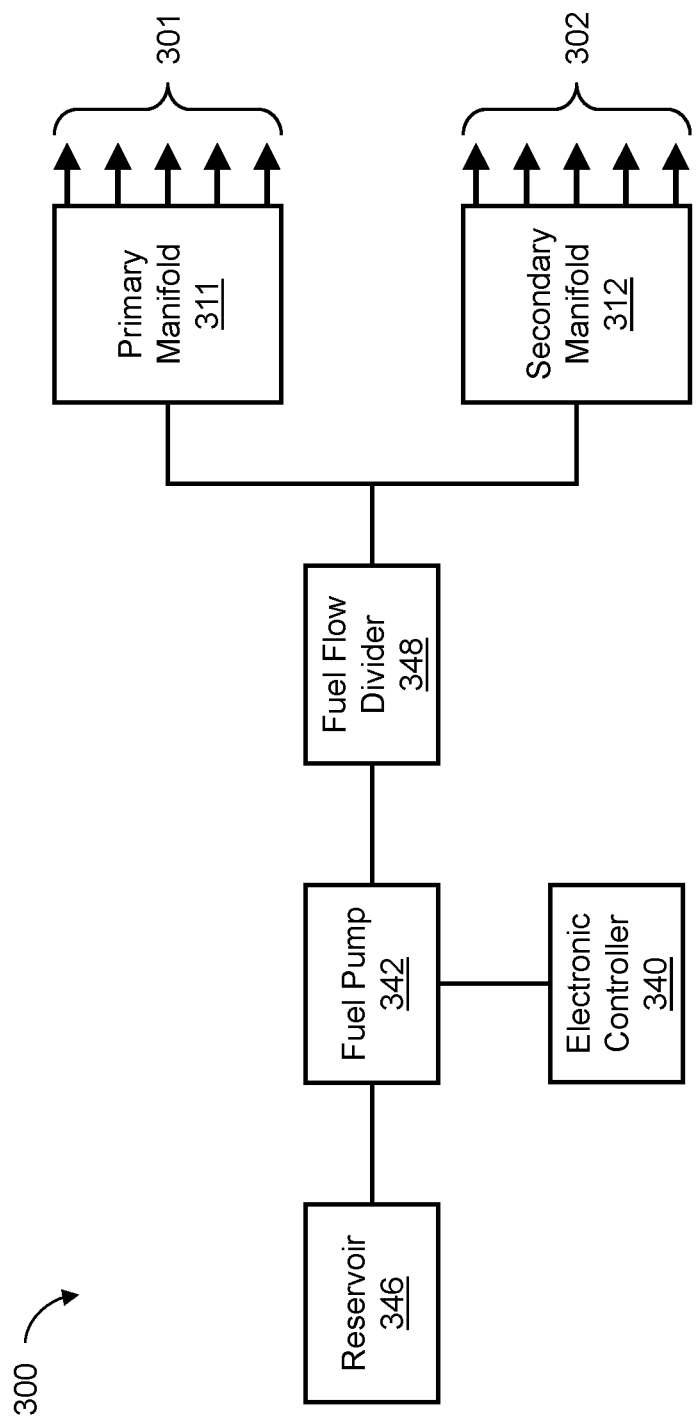
FIG. 3 is a schematic diagram illustrating an example fuel supply system for supplying fuel to the engine of FIG. 2.

Referring to FIG. 3, there is illustrated a fuel supply system 300 for supplying fuel to the combustor 14 of the gas turbine engine 102. In the embodiment illustrated, a first set of nozzles 301 of at least one first (or primary) manifold 311 supplies fuel to the combustor 14, and a second set of fuel nozzles 302 of at least one second (or secondary) manifold 312 supplies fuel to the combustor 14. An electronic controller 340, which may be controller 210 or a different controller, controls a fuel pump 342 to supply fuel from a reservoir 346 to the manifolds 311, 312 through one or more fuel lines. The fuel pump 342 provides the fuel to a fuel flow divider 348, which is operably connected to the manifolds 311, 312.

The primary manifold 311, secondary manifold 312, or both manifolds 311, 312 may be used to supply fuel to the combustor 14 depending on the operating mode of the engine 102. For example, at higher fuel flow (e.g. in active mode), the majority of fuel may be supplied via the secondary manifold 312. At low fuel flow (e.g. in standby mode), all of the fuel may be supplied via the primary manifold 311. In order to avoid coking of the stagnant residual fuel in the secondary manifold 312, the fuel in the secondary manifold 312 may be purged into the combustor, siphoned back into an accumulator device, or naturally emptied through gravity. There may also be other reasons for which it is desirable to purge or empty a fuel manifold when fuel is supplied through a different manifold.

When the engine exits the standby mode, the secondary manifold 312 may be filled using a controlled refilling scheme. In particular, one or more engine operational parameters are monitored as the manifold is filled in order to prevent engine surge. An example method for filling the fuel manifold in accordance with the refilling scheme is illustrated in FIG. 4.

Figure 4:
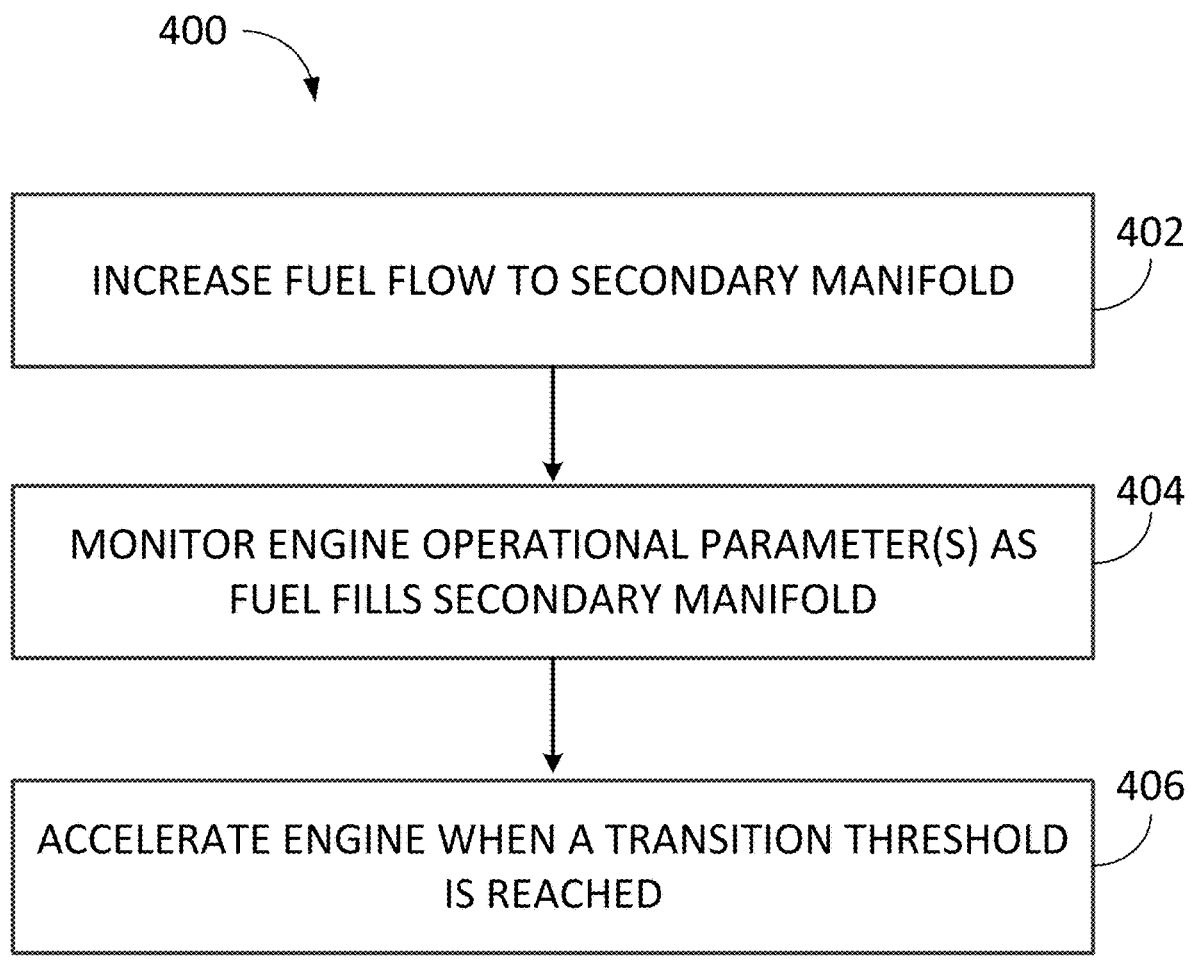
FIG. 4 is a flowchart of an example method for filling a fuel manifold of a gas turbine engine.

With reference to FIG. 4, at step 402, fuel flow to the secondary manifold is increased. It will be understood that if the engine is operating in a mode whereby fuel is provided to the combustor through the secondary manifold and it is the primary manifold that is empty (in whole or in part), then step 402 will consist in increasing fuel flow to a primary manifold.

At step 404, one or more engine operational parameters are monitored as fuel fills the secondary manifold (or the previously substantially empty or completely empty manifold). At step 406, the engine is accelerated when a transition threshold is reached. The transition threshold is indicative that fuel has reached the combustor, i.e. that the manifold and nozzles are filled and that fuel has pushed through the nozzles and into the combustor. The nature of the transition threshold depends on the operational parameter being monitored.

Figure 5A:
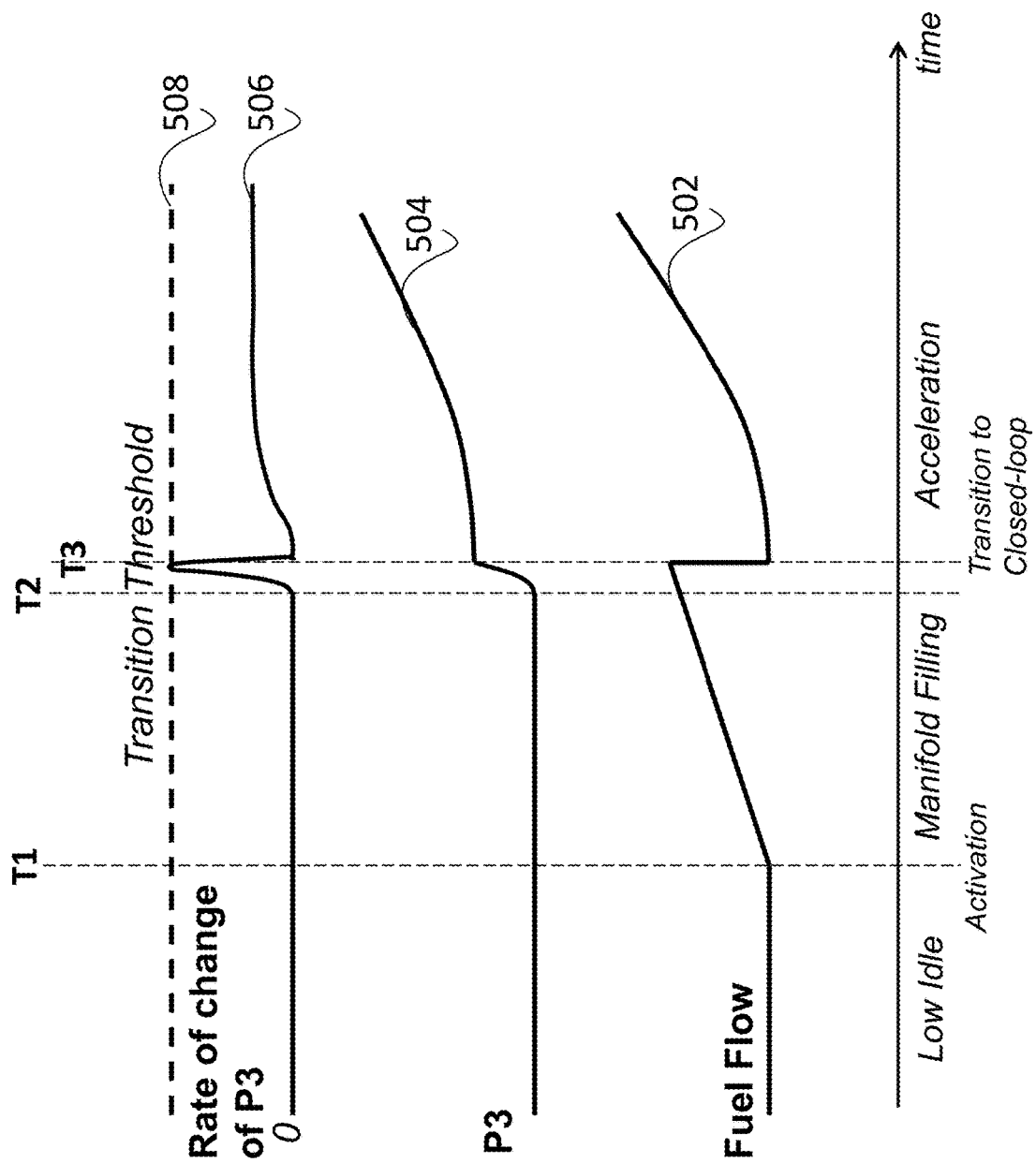

The method 400 will be explained in more detail using specific and non-limiting examples with reference to FIGS. 5A-5F. Referring to FIG. 5A, a first embodiment for the manifold refilling scheme is illustrated. The monitored engine operational parameter is the rate of change of pressure at the outlet of the compressor of the engine, i.e. the rate of change of P3. Curve 502 illustrates fuel flow to the engine over time. Prior to time T1, there is no fuel provided to the engine through the secondary manifold. Curve 504 illustrates P3 concurrently with fuel flow. The rate of change of P3 may be derived from P3 as measured, for example using sensor 202.

At time T1, fuel flow is provided to the empty (in whole or in part) manifold. In this example, fuel is initially provided to the manifold using an open-loop fuel flow control scheme at a predefined rate. Prior to T1, the engine may be in a standby mode or another operating mode whereby substantially no power is provided to the aircraft and at least one manifold of the engine is empty in part or in whole. P3 remains substantially constant until time T2, where it starts to increase. Curve 506 illustrates the rate of change of P3, as compared to a transition threshold 508. In this example, the transition threshold 508 is a maximum limit for the rate of change of P3. At time T2, the rate of change of P3 begins to increase with the increase of P3. At time T3, the rate of change of P3 reaches the transition threshold 508, which triggers acceleration of the engine. The open-loop fuel flow control scheme is transitioned to a closed-loop fuel flow control scheme for engine acceleration. The transition may comprise resetting the fuel flow command to a lower value, such as the value of fuel flow at time T1 when the open-loop fuel flow control scheme was initiated, and applying a closed-loop fuel flow schedule from that value.

The embodiment of FIG. 5A illustrates the "manifold effect", which refers to an engine operational parameter that does not vary (or varies insignificantly) until the fuel has filled the manifold, pushed through the nozzles, and entered into the combustor. The combustion increasing causes the engine operational parameter to vary. The fill rate of the manifold may be reduced quickly when the engine operational parameter begins to change, as demonstrated at time T3. The manifold effect may be observed using various parameters, as demonstrated in the other embodiments illustrated in FIGS. 5B-5F.

Figure 5B:
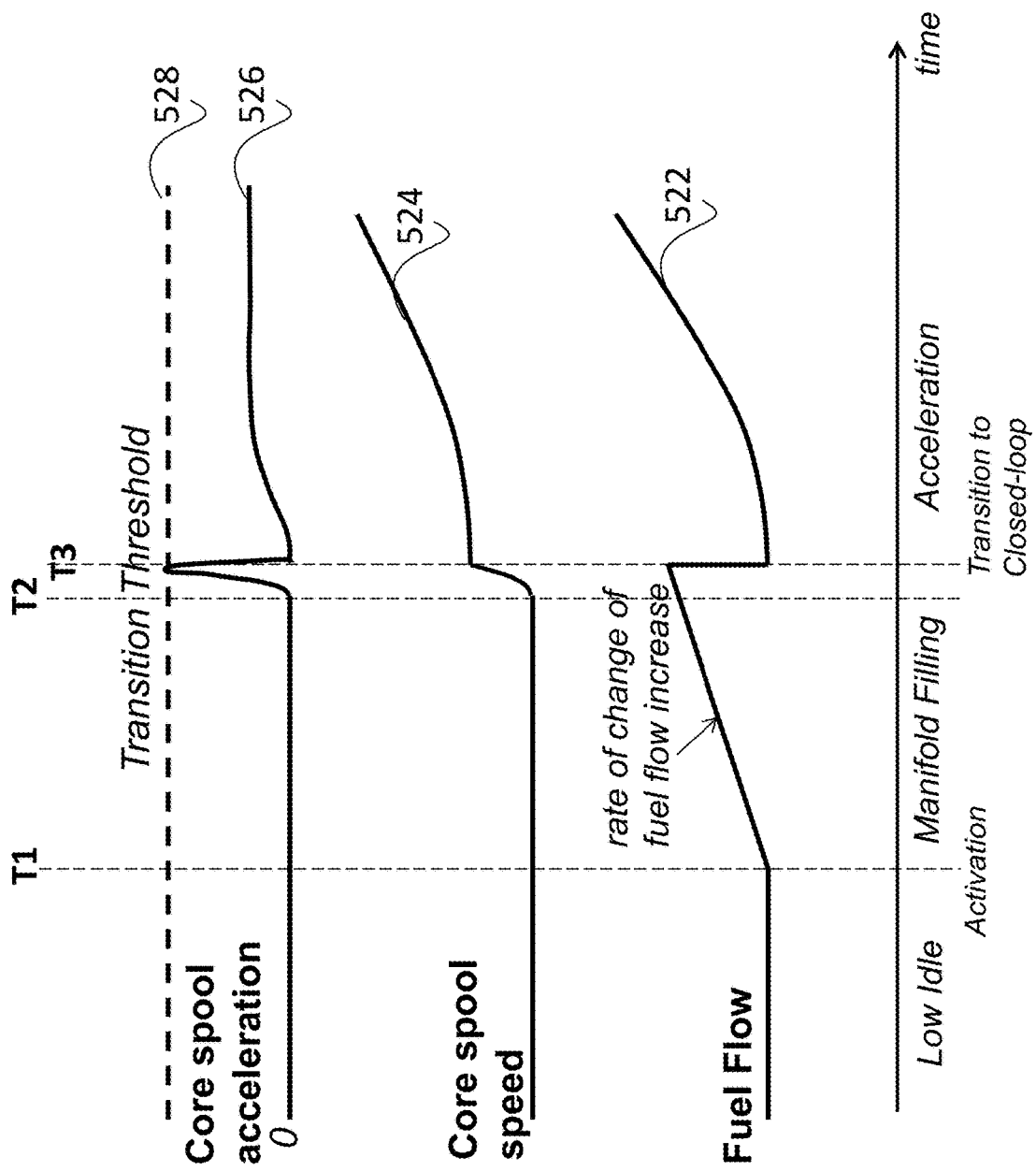

Another embodiment for the manifold refilling scheme is illustrated in FIG. 5B. The monitored engine operational parameter is a rate of change of engine core spool speed, i.e. the rate of change of Ng (or Ngdot). Ng may be used to observe the manifold effect due to the correlation between Ng and P3. Curve 522 illustrates fuel flow to the engine over time. Curve 524 illustrates Ng concurrently with fuel flow. Ngdot 526 may be derived from Ng 524 as measured, for example using sensor 204. Alternatively, Ngdot 526 may be measured directly with an accelerometer or another sensor suitable for measuring acceleration.

As can be seen from FIGS. 5A, 5B, the difference between the two embodiments is the operational engine parameter monitored as fuel fills the manifold. An open loop fuel flow control scheme is used prior to the operational engine parameter reaching the transition threshold 528, and a closed-loop fuel flow control scheme is used after having reached the transition threshold 528. The transition threshold 528, which in this case is a maximum core spool acceleration, acts as a trigger to begin acceleration of the engine once the fuel has reached the combustor and combustion has started.

FIG. 5C illustrates another embodiment for the manifold refilling scheme. The monitored engine operational parameter is the rate of change of engine core spool speed (Ngdot). Curve 532 illustrates fuel flow to the engine over time, curve 534 illustrates Ng concurrently with fuel flow. Ngdot 536 may be derived from Ng 534 as measured, for example using sensor 204. Alternatively, Ngdot 536 may be measured directly with an accelerometer or another sensor suitable for measuring acceleration.

In contrast to the example of FIG. 5B, fuel flow is provided to the manifold in a closed-loop fuel control scheme at time T1 in the embodiment of FIG. 5C, i.e. when the manifold begins to receive fuel. An Ngdot limit 538, used in the closed-loop fuel control scheme, is modulated in order to prevent the fuel flow controller, such as controller 340, from commanding an over-fuel. For example, the Ngdot limit 538 is set to a lower value than nominal at time T1. The lower Ngdot limit 538 is maintained until Ngdot 536 is within a predefined tracking error of Ngdot limit 538. The tracking error thus acts as the transition threshold, indicative of fuel having reached the combustor of the engine. Core spool speed 534 is shown to begin to increase at time T2. The tracking error reaches the transition threshold at time T3, after which the Ngdot limit 538 is ramped back up to a nominal setting at a predefined rate.

Figure 5D:
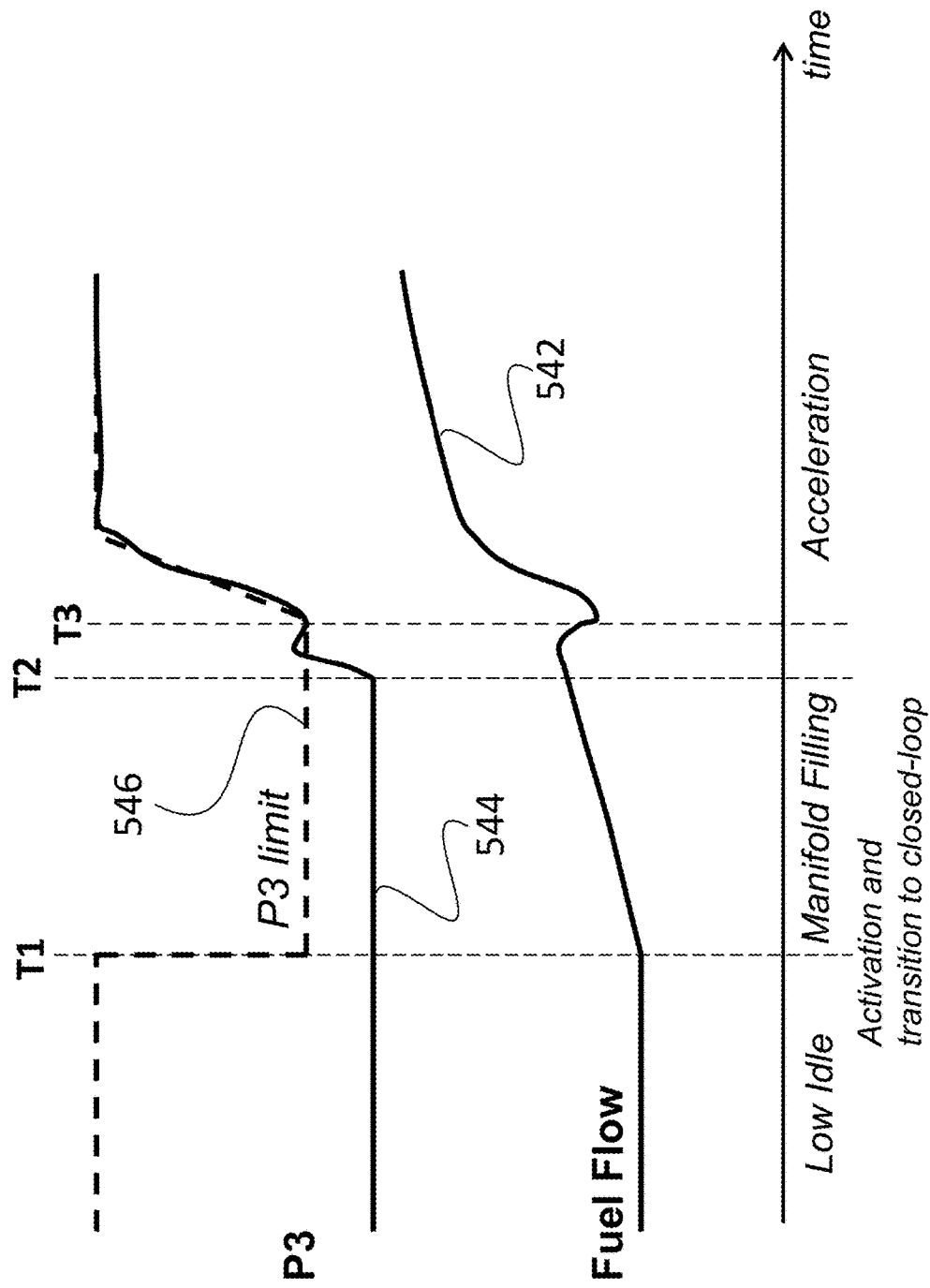

In yet another embodiment, illustrated in FIG. 5D, the monitored engine operational parameter is the pressure P3. Curve 542 is the fuel flow to the engine over time, curve 544 is P3 concurrently with fuel flow. Fuel flow is provided to the manifold at time T1 using a closed-loop fuel control scheme, and P3 is monitored as the manifold fills. P3 is compared to a P3 limit 546, which is modulated to a lower value during the manifold filling phase, and a tracking error between the sensed P3 544 and the P3 limit 546 acts as the transition threshold. The lowered P3 limit may be an offset of an initially sensed P3 value, before it starts to increase. The engine is accelerated at time T3, when the transition threshold has been met.

Figure 5E:
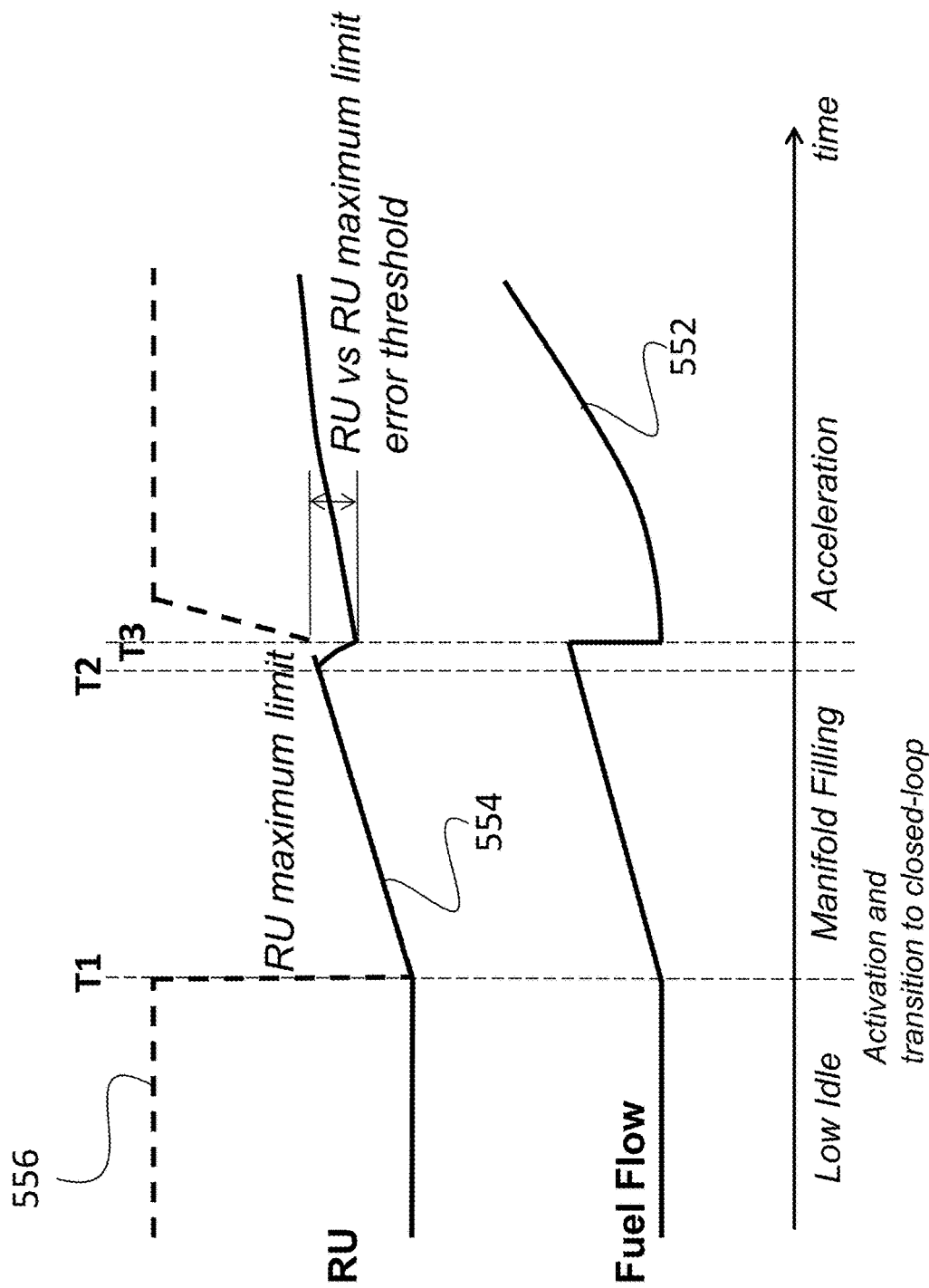

In FIG. 5E, the monitored engine operational parameter is a ratio of commanded fuel flow (Wf) to P3, also referred to as a ratio unit (RU). Curve 552 is fuel flow to the engine over time, curve 554 is RU concurrently with fuel flow. Fuel flow is provided to the manifold at time T1 using a closed-loop fuel control scheme, and RU is monitored as the manifold fills. RU is compared to an RU limit 556, which is modulated to a lower value during the manifold filling phase, and a tracking error between the sensed RU 554 and the RU limit 556 acts as the transition threshold. The lowered RU limit may be an offset of an initially sensed RU value, before it starts to increase. The engine is accelerated at time T3, when the transition threshold has been met.

Figure 5F:
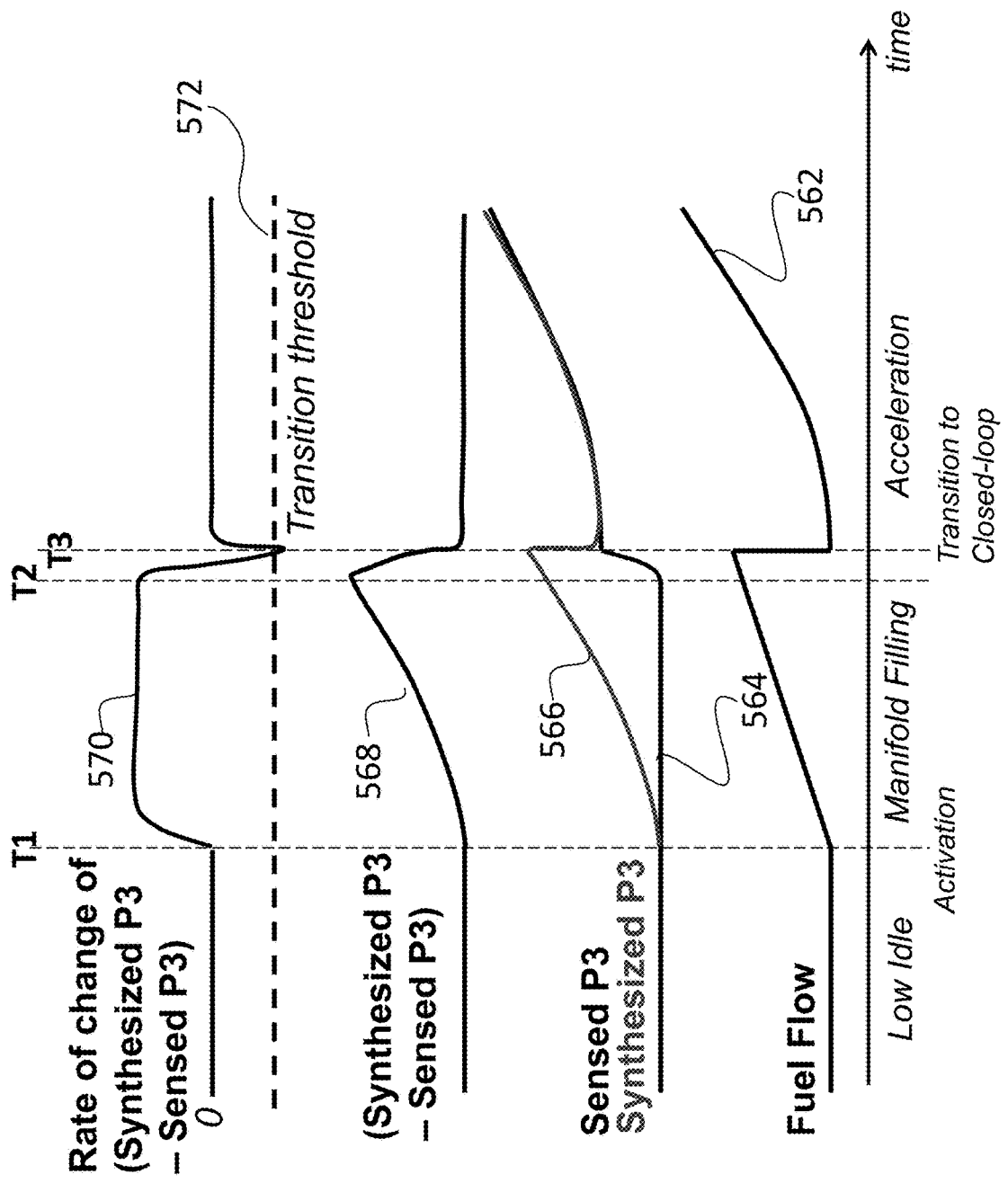

Referring to FIG. 5F, there is illustrated yet another embodiment for the manifold refilling scheme. The monitored engine operational parameter corresponds to the pressure at the outlet of the compressor (P3), but could be any other one of the engine operational parameters mentioned herein, such as rate of change of P3, Ng, Ngdot, RU, and the like. The sensed P3 is compared to a synthesized P3, generated using an engine model. The manifold effect, i.e. the delay in P3 increasing due to the fuel not having reached the combustor, is not present in the engine model. Thus, when the sensed P3 and the synthesized P3 are compared, there is a discrepancy during the manifold filling phase. This discrepancy decreases once the manifold is full, fuel enters the combustor, and combustion is started.

Curve 562 illustrates fuel flow, curve 564 illustrates the synthesized P3, and curve 566 illustrates the sensed P3. Curve 568 illustrates the difference between the synthesized P3 564 and the sensed P3 566. Curve 570 is a rate of change of the difference between the synthesized P3 564 and the sensed P3 566. The rate of change 570 is compared to a transition threshold 572, which is a lower limit for the rate of change. When the rate of change 570 reaches the transition threshold 572, this implies the manifold is full and the fuel has reached the combustor. The sensed P3 566 and the synthesized P3 564 have converged to a common value. This convergence is used to transition the fuel flow control scheme from an open loop fuel flow control to a closed-loop fuel flow control, and to accelerate the engine using the closed-loop fuel flow control scheme.

It will be understood from the embodiments illustrated in FIGS. 5A-5F that many variants are possible for the method 400 of FIG. 4. For example, in the embodiment of FIG. 5A, P3 can be compared to a transition threshold corresponding to an upper limit for P3, instead of comparing the rate of change of P3 to a transition threshold corresponding to an upper limit for the rate of change for P3. Similarly with the embodiments of FIGS. 5B and 5C, the core spool speed may be compared to a transition threshold corresponding to an upper limit for core spool speed instead of comparing the rate of change of the core spool speed to an upper limit for the rate of change of the core spool speed. In yet another embodiment, a pressure sensor may be provided in the manifold and monitored as fuel fills the manifold. The fuel pressure in the manifold will not increase significantly until the manifold is completely filled, at which point fuel will get pushed through the nozzles instead of air. This will result in a signification pressure spike, indicative that the manifold is full. P3 in the embodiments of FIGS. 5A, 5D, and 5F can therefore be replaced with P_manifold. Other variants may also apply.

Figure 6:
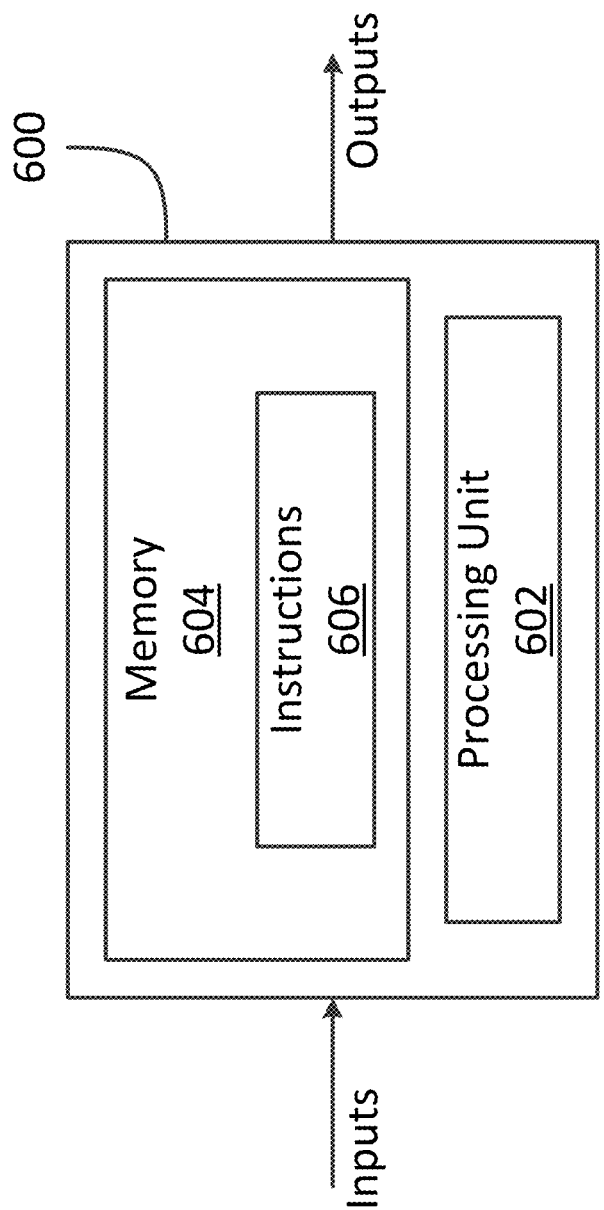
FIG. 6 is a block diagram of an example computing device for implementing the method of FIG. 4.

The method 400 of filling a fuel manifold of a gas turbine engine may be implemented using a controller dedicated to fuel flow, such as controller 340, or using an engine controller 210, configured for operating one or more of the engines 102, 104 in the aircraft 100. With reference to FIG. 6, the method 400 may be implemented by a computing device 600, which can embody part or all of the engine controller 210 and/or the fuel controller 340. The computing device 600 comprises a processing unit 602 and a memory 604 which has stored therein computer-executable instructions 606. The processing unit 602 may comprise any suitable devices configured to implement the functionality described in the method 400, such that instructions 606, when executed by the computing device 600 or other programmable apparatus, may cause the functions/acts/steps performed by a controller 210, 340 and/or described in the method 400 as provided herein to be executed. The processing unit 602 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, custom-designed analog and/or digital circuits, or any combination thereof.

The memory 604 may comprise any suitable known or other machine-readable storage medium. The memory 604 may comprise non-transitory computer readable storage medium, for example, but not limited to, an electronic, magnetic, optical, electromagnetic, infrared, or semiconductor system, apparatus, or device, or any suitable combination of the foregoing. The memory 604 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 604 may comprise any storage means (e.g., devices) suitable for retrievably storing machine-readable instructions 606 executable by processing unit 602.

The methods and systems for filling a fuel manifold of a gas turbine engine as described herein may be implemented in a high level procedural or object oriented programming or scripting language, or a combination thereof, to communicate with or assist in the operation of a computer system, for example the computing device 600. Alternatively, the methods and systems described herein may be implemented in assembly or machine language. The language may be a compiled or interpreted language.

Embodiments of the methods and systems described herein may also be considered to be implemented by way of a non-transitory computer-readable storage medium having a computer program stored thereon. The computer program may comprise computer-readable instructions which cause a computer, or more specifically the processing unit 602 of the computing device 600, to operate in a specific and predefined manner to perform the functions described herein, for example those described in the method 400.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the present disclosure. Still other modifications which fall within the scope of the present disclosure will be apparent to those skilled in the art, in light of a review of this disclosure.

Various aspects of the systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method of operating a gas turbine engine including a primary fuel manifold and a secondary fuel manifold, the method comprising:
   operating the gas turbine engine in a standby mode during which:
      fuel is supplied to a combustor of the gas turbine engine via the primary fuel manifold;
      the fuel is mixed with compressed air and is ignited; and
      the secondary fuel manifold is partly or completely empty;
   transitioning the gas turbine engine from the standby mode to an active mode by:
      providing fuel flow to the secondary fuel manifold of the gas turbine engine to fill the secondary fuel manifold with fuel;
      monitoring at least one engine operational parameter of the gas turbine engine as fuel fills the secondary fuel manifold; and
      when a transition threshold is reached, reducing the fuel flow to the secondary fuel manifold and accelerating the gas turbine engine, the transition threshold being associated with the at least one engine operational parameter and being indicative that fuel has reached the combustor of the gas turbine engine via the secondary fuel manifold.

2. The method of claim 1, wherein the at least one engine operational parameter comprises a rate of change of pressure at an outlet of a compressor of the gas turbine engine.

3. The method of claim 2, wherein providing fuel flow to the secondary fuel manifold comprises providing the fuel flow in an open-loop fuel flow control scheme at a predefined rate.

4. The method of claim 3, wherein accelerating the gas turbine engine comprises transitioning the open-loop fuel flow control scheme to a closed-loop fuel flow control scheme.

5. The method of claim 1, wherein the at least one engine operational parameter comprises a rate of change of engine core spool speed.

6. The method of claim 5, wherein providing fuel flow to the secondary fuel manifold comprises providing the fuel flow in a closed-loop fuel flow control scheme.

7. The method of claim 6, wherein the transition threshold is a tracking error between the rate of change of engine core spool speed and an upper limit for the rate of change of engine core spool speed.

8. The method of claim 1, wherein the at least one engine operational parameter comprises a pressure at an outlet of a compressor of the gas turbine engine.

9. The method of claim 8, wherein the transition threshold is a difference between a synthesized value of the pressure at the outlet of the compressor and a sensed value of the pressure at the outlet of the compressor, the synthesized value generated by an engine model.

10. The method of claim 1, wherein the at least one engine operational parameter comprises a ratio of commanded fuel flow to a pressure at an outlet of a compressor of the gas turbine engine.

11. A system for operating a gas turbine engine including a primary fuel manifold and a secondary fuel manifold, the system comprising:
   a processing unit; and
   a non-transitory computer-readable medium having stored thereon program instruction executable by the processing unit for:
      causing the gas turbine engine to operate in a standby mode during which:
         fuel is supplied to a combustor of the gas turbine engine via the primary fuel manifold;
         the fuel is mixed with compressed air and is ignited; and
         the secondary fuel manifold is partly or completely empty;
      causing a transition of the gas turbine engine from the standby mode to an active mode by:
         providing fuel flow to the secondary fuel manifold of the gas turbine engine to fill the secondary fuel manifold with fuel;
         monitoring at least one engine operational parameter of the gas turbine engine as fuel fills the secondary fuel manifold; and
         when a transition threshold is reached, reducing the fuel flow to the secondary fuel manifold and accelerating the gas turbine engine, the transition threshold being associated with the at least one engine operational parameter and being indicative that fuel has reached the combustor of the gas turbine engine via the secondary fuel manifold.

12. The system of claim 11, wherein the at least one engine operational parameter comprises a rate of change of pressure at an outlet of a compressor of the gas turbine engine.

13. The system of claim 12, wherein providing fuel flow to the secondary fuel manifold comprises providing the fuel flow in an open-loop fuel flow control scheme at a predefined rate.

14. The system of claim 13, wherein accelerating the gas turbine engine comprises transitioning the open-loop fuel flow control scheme to a closed-loop fuel flow control scheme.

15. The system of claim 11, wherein the at least one engine operational parameter comprises a rate of change of engine core spool speed.

16. The system of claim 15, wherein providing fuel flow to the secondary fuel manifold comprises providing the fuel flow in a closed-loop fuel flow control scheme.

17. The system of claim 16, wherein the transition threshold is a tracking error between the rate of change of engine core spool speed and an upper limit for the rate of change of engine core spool speed.

18. The system of claim 11, wherein the at least one engine operational parameter comprises a pressure at an outlet of a compressor of the gas turbine engine.

19. The system of claim 18, wherein the transition threshold is a difference between a synthesized value of the pressure at the outlet of the compressor and a sensed value of the pressure at the outlet of the compressor, the synthesized value generated by an engine model.

20. The system of claim 11, wherein the at least one engine operational parameter comprises a ratio of commanded fuel flow to a pressure at an outlet of a compressor of the gas turbine engine.

* * * * *